United States Patent Office 3,291,728
Patented Dec. 13, 1966

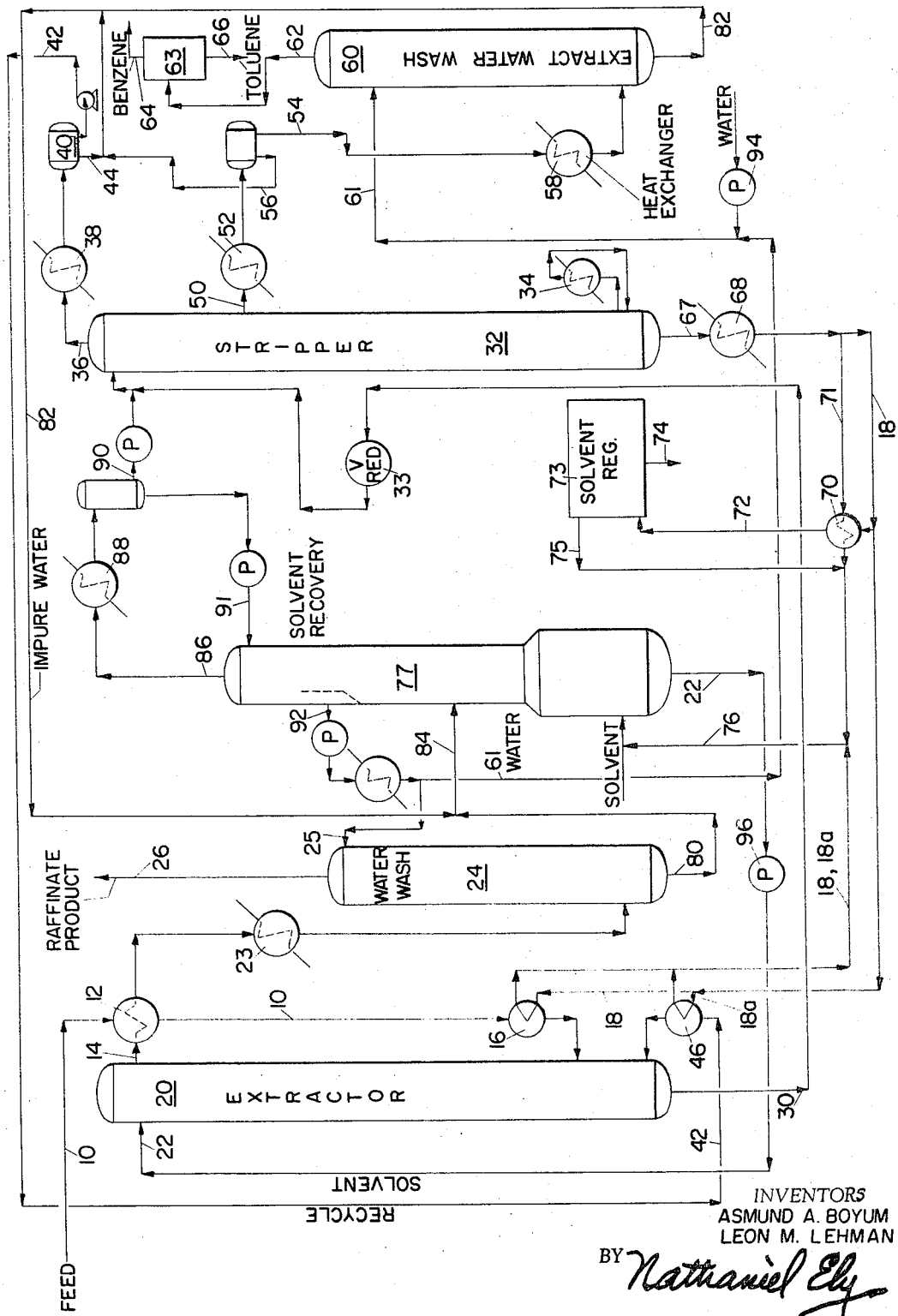

3,291,728
SOLVENT EXTRACTION
Asmund A. Boyum and Leon M. Lehman, Brooklyn, N.Y., assignors to Hydrocarbon Research, Inc., New York, N.Y., a corporation of New Jersey
Filed Dec. 27, 1963, Ser. No. 333,898
7 Claims. (Cl. 208—321)

This invention relates to improvements in the methods of extracting aromatic hydrocarbons from mixtures of other close boiling hydrocarbons including paraffins, olefins and naphthenes.

More specifically, the invention relates to an improvement in the process of solvent extraction whereby more efficient utilization of heat to the process is obtained.

The numerous selective solvents which have been proposed for this separation can be classified into two groups; one where the solvent is more volatile than the hydrocarbons to be separated and the other where the solvent is less volatile. Our invention is particularly applicable to the less volatile class of solvents, including glycols such as diethylene glyco (DEG) and akanolamines such a monoethanolamine (MEA). Our invention is particularly concerned with aqueous solutions of such solvents, water being the secondary solvent.

In such a process, the aromatic hydrocarbons are generally extracted in a suitable extraction column. The solvent is then regenerated by stripping the dissolved hydrocarbons in a reboiled stripper. Part of the stripped hydrocarbons are withdrawn as the aromatic product while the rest is returned to the extractor as a recycle. If aromatics of high purity are required, the recycle is generally obtained as stripper overhead and the aromatics product is withdrawn as a vapor sidestream. In the presence of solvent, nonaromatic compounds are more volatile than aromatics, and, consequently, the stripping column in such a case acts to purify the aromatic product as well as to regenerate solvent.

Previous inventors have claimed economic advantage for isothermal operation of the extractor-stripper combination. In such systems the regenerated solvent is pumped directly from the bottom of the stripper to the extractor without intermediate heat exchange.

In this present invention, the system is deliberately maintained as a non-isothermal operation between the bottom of the stripper and the extraction column. Specifically, the bottom of the stripper is run at a substantially higher temperature than the hot solvent entering at the top of the stripper by maintaining a superatmospheric pressure in the stripper.

Heat inefficiency in solvent extraction systems is generally due to excessive vaporization in the solvent stripper and wasteful heating and cooling of the recirculating solvent. For extraction systems where the final product is removed as a side stream from the stripper and undesirable components are removed as stripper overhead to be refluxed to the extractor, no heat would be wasted in the stripper if only the above mentioned components were vaporized. However, the practical maximum separation of components in the stripper is obtained when the fat solvent can be depressured to the operating pressure of the stripper at such temperature that flash vaporization would not occur. This procedure would result in maximum concentration of the lighter components at the top of the stripper or a minimum reflux with minimum heat losses. It would simultaneously secure maximum concentration of product in the stripper sidestream vapor. For an aromatics extraction unit using an aqueous solvent, any aromatics, water or solvent in the stripper overhead or any water or solvent in the product sidestream represents a heat loss. Numerous pilot plant runs with both aqueous DEG and aqueous MEA as solvent, and process studies using experimentally determined data have shown that the amount of aromatics, water, and solvent in stripper overhead vapors is exceedingly sensitive to the temperature difference between the bottom and top of the stripper, or to the amount of flash vaporization occurring in depressuring fat solvent to stripper pressure. Pilot plant runs where the bottom stripper was run at 290° F. showed 70 percent increase in stripper overhead vapor by increasing the temperature at the top of the stripper from 220 to 240° F.

Another reason for the extreme sensitivity of amount of overhead vapor to the temperature of fat solvent entering the stripper is that any aromatics in the reflux will be re-extracted into the fat solvent, which will in turn cause more aromatics to vaporize into the overhead vapor, etc. thus giving rise to a vicious cycle before stable conditions have been reached. Increased recycle rate will also, in many cases, demand higher solvent rates in the extractor. This will in turn increase the reflux since more paraffins dissolve in the fat solvent. It is, therefore, very desirable to keep the top of the stripper at a substantially lower temperature than the bottom of the stripper in order to optimize the operation.

Thus, by increasing the temperature difference between fat solvent entering the stripper and lean solvent leaving the stripper one can minimize the heat required for vaporization of overhead and sidestream vapors.

Heat must be removed from the solvent somewhere along its path from the bottom of the stripper to the extractor and back to the stripper top in order to obtain optimum temperature at the top of the stripper. This heat must be utilized in the process itself since otherwise heat losses in cooling the solvent would be somewhat larger than heat gains in the stripper due to less vaporization.

For our invention, the lean solvent from the stripper bottom will be the hottest point in the solvent extraction system; for aqueous DEG and MEA as solvents, the thermal stability of the solvents allows one to operate up to about 340° F. Clearly, maximum heat utilization will be obtained in a plant which has only one steam service, that for the stripper reboiler, and where the remaining heat duties are supplied by the sensible heat of the lead solvent. As earlier explained, not only would this result in no wasteful heating and cooling of the solvent, but it would, in addition, lead to large heat savings in the stripper since the excessive vaporization would be minimized.

Our invention is such an extraction plant, where a major part of the above-mentioned sensible heat is recovered without use of heat exchange surfaces. The feed and reflux streams to the extractor are, however, heated by heat exchange with the solvent.

Other uses of the solvent stream are connected with necessary auxiliaries to the extractor-stripper system. In the stripper, both the sidestream product and the overhead recycle are withdrawn as vapors. In solvent systems containing water, a substantial amount of water and solvent are also inevitably present in these streams, though where the solvent is relatively non-volatile, such as DEG, only a relatively small amount of solvent will go into these vapor streams. After condensing and cooling, the vapors form two liquid phases, one aqueous and the other hydrocarbon. Even where the amount of solvent in the vapors is relatively small, this water cannot be discarded without great economic loss. Because these aqueous streams have just been in contact with aromatic hydrocarbons they cannot be returned directly to the stripped solvent since even a very small amount of dissolved aromatics in the lean solvent will have a marked effect on reducing the recovery of aromatics in the extractor. In some cases, this water is vaporized and returned to the solvent stripper near the bottom. As a source of vapor to strip the solvent, these streams are of limited value for, as mentioned above, they contain small amounts of hydrocarbons. Consequently, to obtain high aromatics recoveries it is still necessary to provide essentially the same amount of vapor by reboiling as in towers not using this method of returning water to the system.

In addition to these water streams which come from stripper vapor products, water is used to wash both the raffinate and extract products to remove the last traces of solvent. Again, though the solvent quantities are relatively small, they must be recovered. This is generally done in a solvent water fractionator which takes water overhead and the desired concentration of solvent as bottoms. The same tower can also be used to handle the water from stripper overheads. Furthermore, as it is desirable to reuse the water for washing and minimize makeup, the water should be withdrawn as a sidestream taken above the feed location. Small amounts of hydrocarbons entrained or dissolved in the solvent-water mixture will be the net overhead. The water so produced can be used to wash the extract without contaminating this product or to wash raffinate without additional aromatics loss.

In present extraction systems, the water-solvent fractionator must be reboiled by an outside source of heat. However, in a non-isothermal system, the necessary vapor for the column can be supplied without an external reboiler. The lean solvent from the stripper contains less water than the rich solvent from the extractor since some water is vaporized in the stripper. Readdition of this water will lower the boiling temperature of the aqueous solvent. Furthermore, the water-solvent fractionator can be run at a lower pressure than the solvent stripper. Introducing the solvent from the bottom of the stripper, after taking out some heat in exchange, if desirable, to the bottom of the water-solvent fractionator tower, results in considerable vaporization due to both reduced pressure and dilution of the solvent by water coming down the tower. Thus, the vapor for the column is in effect supplied from the sensible heat of the solvent as it is flashed. The heat duty for reboiling the water-solvent fractionator usually represents a substantial part of the overall heat requirement for the extraction plant. The entire heat duty in our invention is obtained from the sensible heat of the solvent. Thus the solvent has been cooled and the fractionator reboiled without the use of either heat exchanger or reboiler. A secondary benefit of this scheme is that whatever aromatics may still be left in the lean solvent from the stripper will be substantially stripped in the fractionator.

In addition to utilizing the heat in the hot solvent within the extraction process, this heat can also be used for outside services such as reboiling fractionating towers, One preferred application is the reboiling of the tower separating benzene from toluene, particularly where the aromatic product from the extraction system contains benzene and toluene. In another case, it can be used in a multiple fractionation of separating toluene-xylene bottoms from benzene overhead and thereafter separating the toluene from the xylene.

Another distinct advantage of the non-isothermal system of this invention is that the stripper reboiler duty is automatically minimized without the need for special equipment to handle the rich solvent as it goes from the extractor to the stripper. When the extraction column and the stripper are operated in an isothermal manner, the release of pressure in the line carrying hydrocarbon-containing aqueous solvent between the extractor and stripper will result in excessive flash vaporization. This flashing, in addition to increased stripper reboiler duty, is costly in terms of equipment to condense the vapors and return them to the extractor as recycle.

For any given solvent, or solvent concentration in aqueous solution, the temperature at the bottom of the stripper is a unique function of the pressure. In addition to raising the temperature to obtain the previously discussed benefits of non-isothermal operation, the higher stripper pressure also reduces the diameter of the stripping column required. This is due to the ability of any given tower to handle a higher vapor rate at a higher pressure.

At the same time, the non-isothermal operation of this invention makes it possible for the extractor to operate at a lower temperature than the solvent stripper bottoms. This results in a reduced extractor pressure as the minimum extractor pressure is the sum of the vapor pressures of the hydrocarbons in the raffinate product and vapor pressure of the aqueous solvent at the operating temperature of the extractor. The reduced extractor pressure results in reducing the thickness of the column wall required. It also reduces the power requirement to pump in the regenerated solvent.

Our invention is thus based on the broad concept of solvent extraction of various hydrocarbon fractions wherein simplified apparatus is accomplished with a relatively lower requirement for utilities whereby the solvent extraction can be accomplished at a lower cost.

Further objects and advantages of our invention will appear from the following description of a preferred form of embodiment of our invention taken in connection with the attached drawing illustrative thereof, such drawing being a schematic flow diagram for solvent extraction of hydrocarbon feed.

The feed 10, which is a mixture of paraffins and aromatics as hereinafter set forth, is preheated at 12 against raffinate 14 and then brought to the temperature of the extractor by heat exchange at 16 with a portion of the hot solvent stream 18. The feed 10 is then introduced into the lower portion of the extractor column 20. Here it is contacted with an aqueous solvent such as DEG or MEA entering at 22. Such solvents preferably contain from 4.0 to 20.0 weight percent water. The solvent is introduced at the top of the column 20 at substantially the temperature of the feed. Raffinate, containing essentially all the paraffins in the feed, goes out the top of the column at 14. It is then cooled by heat exchange against feed at 12 and with water at 23, and is then water-washed in raffinate water wash tower 24 with water entering at 25. The net raffinate is removed at 26 as a product from the system.

The extract 30 leaving the bottom of extractor 20 and containing solvent and dissolved hydrocarbons is fed to the top of the stripper 32, flashing through valve 33. This stripper is reboiled at 34 by steam. The overhead at 36 is withdrawn as a vapor, condensed at 38 and separated at 40 into a hydrocarbon phase 42 and an aqueous phase 44. The hydrocarbon phase 42 is heated at 46 to the desired extractor temperature by exchange with hot solvent 18a and returned to the bottom of the extractor column 20 as recycle.

The net aromatic product from stripper 32 is withdrawn at 50 as part of a vapor sidestream. This sidestream is condensed at 52 and separated into a hydrocarbon phase 54 and an aqueous phase 56. The hydrocarbon phase 54 is water cooled at 58 and then water-washed in the extract water wash tower 60 into which water is introduced at 61. The extract removed overhead at 62 may then be fractionated at 63 into benzene product 64 and toluene product 66 by conventional distillation.

The pressure in the stripper 32 is controlled so that the temperature at the bottom is from 30° to 60° F. above that in the extractor 20. This permits the use of a relatively low pressure vessel for the extractor 20. Furthermore, it materially reduces the load on reboiler 34, and the vapor load in stripper 32.

The stripped solvent 67 at the relatively high temperature can thus give up heat at heat exchanger 68 which may be the reboiler for the benzene-toluene fractionator 63 and then may pass through line 71 through heat exchanger 70 to heat a slipstream 72 of the solvent 18 which is regenerated in solvent regenerator 73. Depending on whether the solvent is DEG or MEA, this regenerator 73 may be either of vacuum or atmospheric type. A purge stream is removed at 74. The regenerated solvent at 75 is then joined with the portions 18 and 18a of the solvent stream and fed at 76 with fresh or make-up solvent to the solvent recovery tower 77.

The aqueous phases 44 and 56 from the condensed overhead and sidestream from stripper 32 are combined with the aqueous effluent 80 and 82 from water wash towers 24 and 60 and fed at 84 to an intermediate part of the solvent recovery tower 77. The pressure of this tower is controlled to hold the temperature of the solvent in the bottom of the tower at the temperature in the extractor. This temperature is lower than that of the incoming solvent and the difference in sensible heat provides the necessary vapor for the column to operate without a reboiler.

Any hydrocarbons in the feed to the tower 77 are taken as part of the overhead at 86 which is condensed at 88 and pumped in line 90 to the stripper 32. The aqueous phase from the overhead is used as reflux 91 for the solvent recovery tower. Pure water for the water wash towers may be withdrawn at 92 as a sidestream above the point where the impure water was fed to the tower and is used for water feed at 25 to water wash tower 24, and in line 61 for water wash tower 60. Make-up water may be added if necessary at 94. Solvent 22 is pumped at 96 directly from the bottom of the solvent recovery tower 77 to the top of the extractor column 20.

A typical example of operating conditions for the foregoing unit is shown on the following table:

|  | Critical Streams | | | | |
| --- | --- | --- | --- | --- | --- |
|  | 10 | 22 | 26 | 62 | 67 |
|  | Feed | Solvent from Solvent Recovery | Raffinate | Extract Product | Solvent from Stripper |
| C₆ Paraffins | 17,073 |  | 17,073 |  |  |
| C₇ Paraffins | 12,531 |  | 12,531 |  |  |
| Benzene | 4,303 |  | 19 | 4,284 |  |
| Toluene | 9,314 |  | 186 | 9,128 |  |
| DEG |  | 457,000 |  |  | 456,215 |
| Water |  | 62,400 |  |  | 52,070 |
| Total, #/hr | 43,221 | 519,400 | 29,809 | 13,412 | 508,285 |
| B.p.s.d. | 4,000 | 32,000 | 2,950 | 1,050 | 31,300 |
| °API | 59.4 |  | 73 | 3,012 |  |
| Sp. Gr. at 60° F. |  | 1.11 |  |  | 1.11 |
| M/hr | 481.2 | 7,780 | 327.1 | 154.1 | 7,198.8 |
|  | 90 | 67 | 91 | 87 | 71 |
| Temperature, ° F. | 100 | 275 |  |  | 325 |
| Pressure, p.s.i.g. | 160 | 6 |  |  | 28 |

Heat duties, in a typical unit, are approximately as follows:

Item No.:                        Duty B.t.u./hr.
- 34 (Input) — 30,000,000
- 16 (Recovery) — 2,600,000
- 46 (Recovery) — 1,250,000
- 70 (Recovery) — 1,900,000
- 68 (Recovery) — 4,000,000

In addition, this system eliminates a reboiler on tower 77 which would require 8,360,000 B.t.u./hr.

It will thus be apparent that we have invented and described a unique solvent extraction system for the separation of aromatics from a mixed hydrocarbons containing feed and we therefore desire a broad interpretation of our invention within the scope and spirit of the disclosure herein and limited only by the scope of the claims appended hereinafter.

We claim:
1. A solvent extraction process for the separation of aromatic hydrocarbons from a mixture thereof with non-aromatic hydrocarbons wherein said mixture is contacted with a selective solvent in an extraction zone to form a raffinate and a rich solvent stream, said solvent containing a primary solvent less volatile than said aromatic hydrocarbons, and a water content of from 4 to 20 weight percent, vaporizing from the rich solvent stream dissolved hydrocarbons, part of the water and some primary solvent in a reboiled solvent stripping zone thereby forming a lean solvent separately cooling overhead and sidestream effluent from the stripping zone, recovering solvent-containing water streams from the resulting stripper vapors to produce an overhead recycle fraction rich in non-aromatic and a substantially pure aromatic product as a sidestream, said aromatic product stream and said raffinate stream from the extractor being water washed to recover traces of primary solvent and to produce effluents of solvent-containing water streams, the improvement in said process which comprises maintaining the stripping zone at superatmospheric pressure to obtain a lean solvent of substantially higher temperature than the temperature in the extraction zone, passing all said solvent-containing water streams to a fractionating zone, reboiling said fractionating zone by introducing a substantial part of said lean solvent from the stripping zone in flashing relation to the bottom of said fractionating zone, thereby obtaining substantially pure water overhead, and a lean solvent bottoms of lower heat content and desired content of water for reuse in the extraction section.

2. A process as claimed in claim 1 wherein the stripped solvent is passed in heat exchange to the hydrocarbon feed to the extraction zone whereby the stripped solvent heats the feed.

3. A process as claimed in claim 1 wherein the stripped solvent is passed in heat exchange to the hydrocarbon recycle to the extraction zone whereby the hydrocarbon recycle is heated thereby.

4. A process as claimed in claim 1 wherein the stripped solvent reboils the tower wherein the extract product is fractionated into at least two fractions.

5. A solvent extraction process as claimed in claim 1 wherein the selective solvent is aqueous monoethanolamine.

6. A solvent extraction process as claimed in claim 1 wherein the selective solvent is aqueous DEG, containing from 4 to 15 percent water by weight.

7. A solvent extraction process as claimed in claim 1 wherein the rich solvent stream is passed to the vaporizing zone without substantial temperature change but with pressure reduction, supplying heat to said vaporizing zone in sufficient amounts to vaporize extract hydrocarbons and to increase the temperature in the stripping zone to obtain a stripped solvent of substantial heat content, and passing the stripped solvent in heat exchange with the hydrocarbon feeds to the extraction step whereby the stripped solvent supplies substantially all of the heat requirements in the extraction section before the solvent enters the extraction zone.

References Cited by the Examiner

UNITED STATES PATENTS

| | | | |
|---|---|---|---|
| 2,444,582 | 7/1948 | Smith | 208—321 |
| 2,878,261 | 3/1959 | Broughton | 208—323 |
| 3,065,169 | 11/1962 | Zuiderweg et al. | 208—321 |

DELBERT E. GANTZ, *Primary Examiner.*

HERBERT LEVINE, *Assistant Examiner.*